US005078825A

United States Patent [19]

Hirabayashi

[11] Patent Number: 5,078,825

[45] Date of Patent: Jan. 7, 1992

[54] AUTOMATIC PAPER FEED DEVICE

[76] Inventor: Yoshiyuki Hirabayashi, 28, Uguisudai, Nagaokakyo-shi, Kyoto, Japan

[21] Appl. No.: 522,463

[22] Filed: May 14, 1990

Related U.S. Application Data

[63] Continuation of Ser. No. 393,762, Aug. 14, 1989, abandoned.

[30] Foreign Application Priority Data

Aug. 15, 1988 [JP] Japan .......................... 63-107821[U]

[51] Int. Cl.[5] ............................................ B32B 1/00

[52] U.S. Cl. .................................. 156/361; 156/519; 270/21.1

[58] Field of Search ................ 270/21.1, 41; 156/350, 156/361, 264, 271, 259, 268, 510, 512, 516, 517, 519

[56] References Cited

U.S. PATENT DOCUMENTS 4,538,517 9/1985 Michalik et al. ............... 270/21.1 X
4,725,050 2/1988 Fujishiro ....................... 270/21.1 X

*Primary Examiner*—David Simmons
*Assistant Examiner*—Robert Barker

[57] ABSTRACT

An automatic paper feed device provided in a turnbar unit of a rotary press includes a slitter for slitting a web of paper in half. A paper feed rope having a leader connected thereto is located near the slitter. When the leading end of the web has passed through the slitter, the paper feed rope begins to move so that the leader will be moved in juxtaposition with the leading end of one of the two slitted webs. When the leading end of one of the webs reaches a predetermined position, a tape applicator will be activated to apply tapes both to the leader and the leading end of one of the webs so as to straddle them. The web thus connected to the paper feed rope through the leader is guided by the rope through a predetermined paper feed path.

1 Claim, 3 Drawing Sheets

AUTOMATIC PAPER FEED DEVICE

This application is a continuation-in-part of now abandoned application, Ser. No. 07/393,762 filed on Aug. 14, 1989 now abandoned.

The present invention relates to an automatic paper feed device for use in a turnbar unit of a rotary press for newspapers or the like.

It is a growing tendency these days to automate paper feed devices for use in a turnbar unit. For example, in Japanese Utility Model Unexamined Publication No. 60-141236, such an automatic paper feed device is disclosed which comprises an auxiliary slitter knife for slitting a web of paper being fed into the turnbar unit to a larger width than a standard paper width, another slitter knife located upstream of the auxiliary slitter knife to slit the web of paper to the standard paper width, and a cutter located upstream of the slitter knife to cut the web so as to connect the cuts formed by the slitter knives into one line and thus to cut the web in half.

An apparatus disclosed in Japanese Patent Unexamined Publication No. 61-167553 includes belts provided in the paper feed paths at a driving side and an operating side of the apparatus so as to extend throughout the apparatus from its paper feed unit to the folding unit. Webs of paper are coupled to the respective belts and fed through the paper feed paths in the turnbar unit by means of the belts.

With the former prior art, it is necessary to provide a plurality of slitter knives and cutters as well as control devices for controlling each of the knives and cutters. This will not only complicate the construction of the whole apparatus but also lead to an increase in the production cost of the apparatus.

With the latter prior art, it is not necessary to use so many slitter knives. But since it is necessary to provide belts both in the paths at the operation side and the driving side, the construction of the whole apparatus will be inevitably complicated and the production cost will increase.

It is an object of the present invention to provide an automatic paper feed device for use in a turnbar unit which obviates the abovesaid shortcomings and which is simple in construction, reliable in performance and inexpensive.

In accordance with the present invention, there is provided an automatic paper feed device for a turnbar unit of a rotary press, comprising a slitter for slitting a web of paper being fed into two webs, a linear paper feed means having a leader connected thereto, linear paper feed means being adapted to start moving substantially in the same direction as the feed direction of the web of paper when the leading end of the web has passed the slitter, so that the leader will be moved in juxtaposition with the leading end of one of the two slitted webs, a sensor for detecting the position of the leading end of the one of the webs and generating a signal, laminating means adapted to be activated by the signal from the sensor to laminate the leader to the leading end of the one of the webs, whereby guiding the one of the webs through a predetermined paper feed path with the linear paper feed means.

Other features and objects of the present invention will become apparent from the following description taken with reference to the accompanying drawings, in which.

Figure 1:
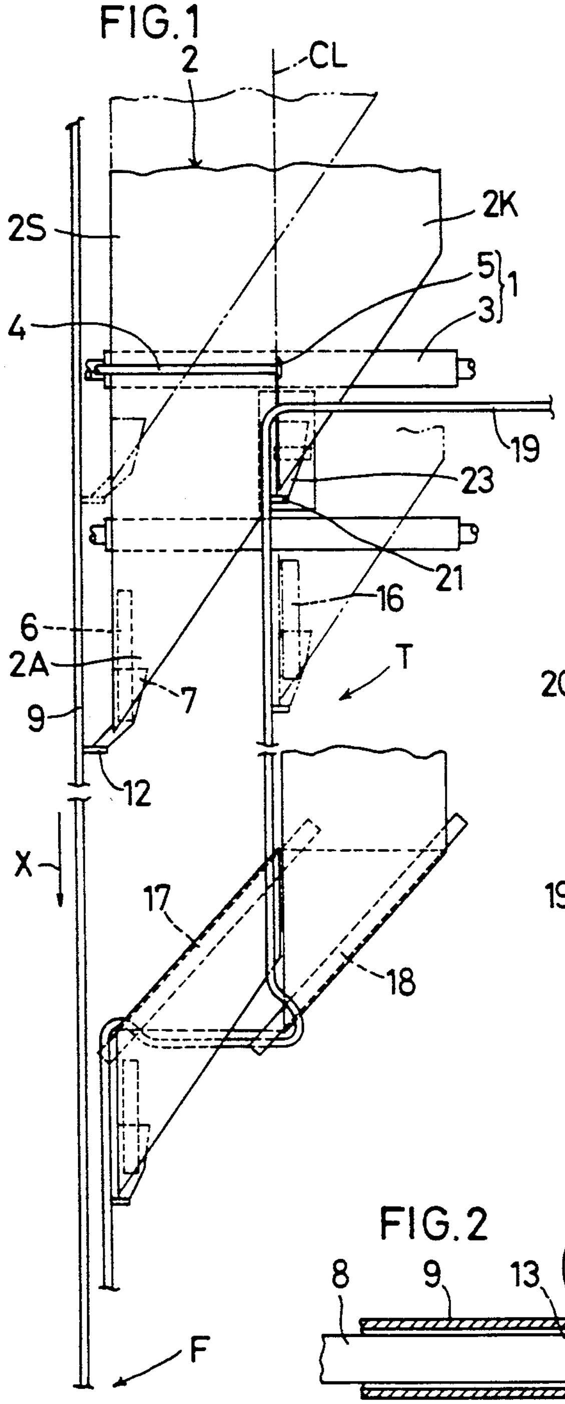
FIG. 1 is a plan view of a portion of the automatic paper feed device embodying the present invention.

FIG. 1 shows the automatic paper feed device according to the present invention. In this figure, numeral 1 designates a slitter for slitting in half a web of paper 2 being fed from a printing unit. It comprises a drag roller 3 provided to extend at a right angle to the feed direction X of the web 2 and a slitter knife 5 mounted on a support member 4.

The web 2 is adapted to be cut in half along its center line CL extending in the feed direction X when passing the slitter 1. It is thus cut into two webs of paper, i.e. a web 2S at the lefthand side or at the operating side and a web 2K at the righthand side or at the driving side. Before being slitted in half, the web 2 has its leading end 2A cut obliquely so that the pointed tip will be located at the operating side. The web 2 has a leader 7 in the form of a film stuck thereon near its pointed tip by means of a reinforcing tape 6 such as a kraft tape. Before being slitted, the web 2 is fed with its tip held by a paper feed rope 8 provided along a paper feed path.

Figure 3:
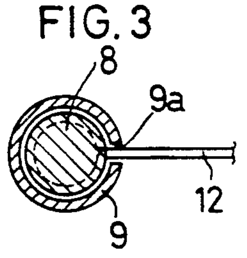
FIGS. 2 and 3 are sectional views of an example of the paper feed rope.
Figure 4:
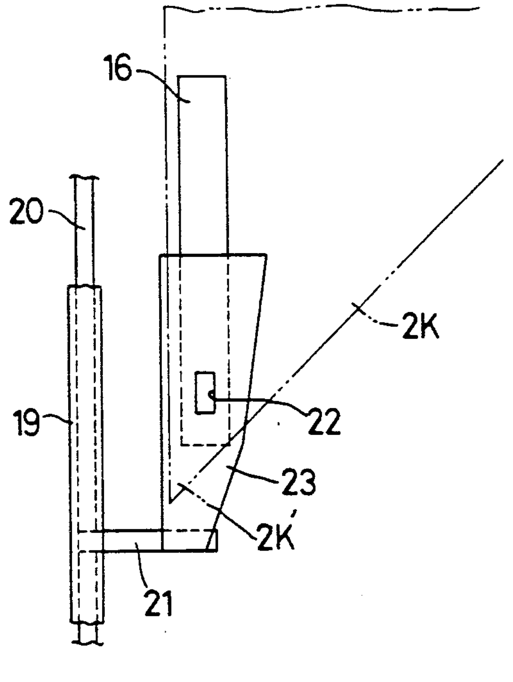
FIG. 4 is a plan view of the paper feed rope provided in the turnbar unit.
Figure 2:
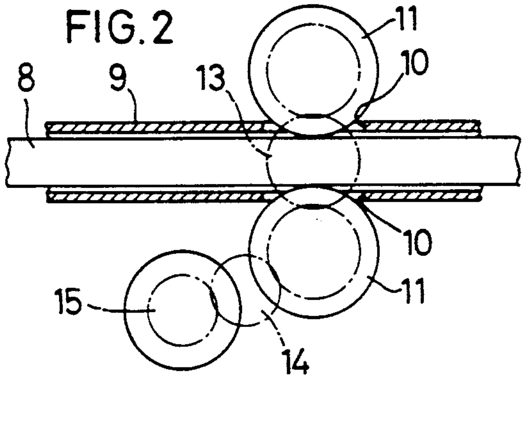

As shown in FIGS. 2 to 4, the paper feed rope 8 is provided to run through a guide pipe 9 having a suitable rigidity such as a conduit pipe and formed with a slit 9*a* along one side thereof so that it has a sectional shape of the letter C. The paper feed rope 8 is held by and between pairs of wheels 11 received in pairs of opposed cutouts 10 formed in the upper and lower sides of the guide pipe 9 so as to be fed in one direction by rotating the wheels 11. The paper feed rope 8 is provided at one side thereof with an arm 12 extending horizontally through the slit 9*a* formed in the guide pipe 9. The leader 7 is secured to the arm 12. Other parts numbered in FIG. 2 are coupling rings 13 and 14 and a drive shaft 15 for a driving means (not shown).

Returning to FIG. 1, a reinforcing tape 16 similar to the reinforcing tape 6 is stuck on the web of paper 2S at the operating side near its tip.

Numerals 17 and 18 designate turnbars provided in a turnbar unit T so as to extend in parallel to each other at an angle of about 45 degrees with respect to the guide pipe 9. They are used to put the web 2K at the driving side and the web 2S at the operating side one upon the other.

Figure 5:
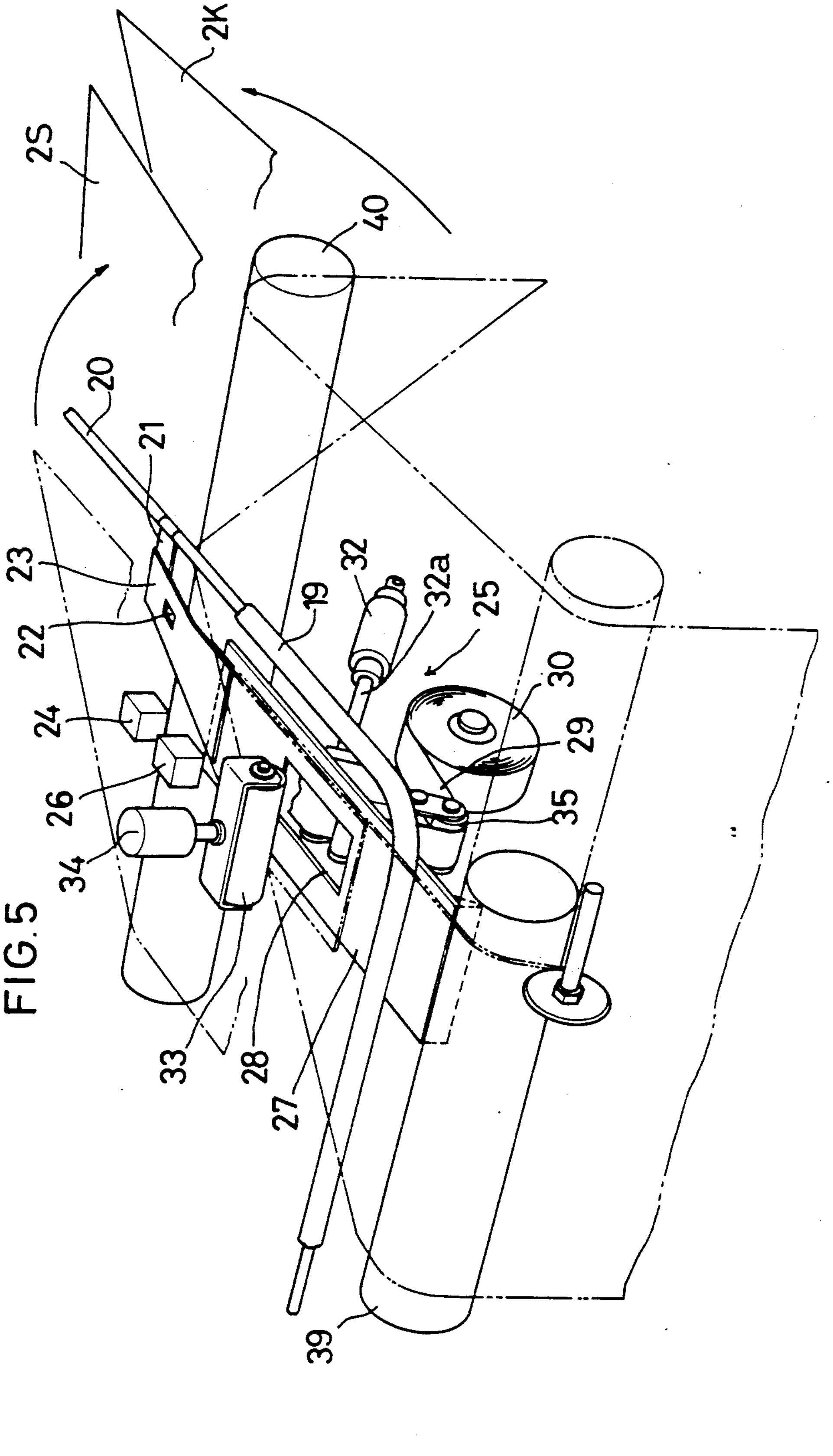
FIG. 5 is a perspective view of a portion of the turnbar unit.

FIGS. 4 and 5 show the details of the turnbar unit T in which numeral 19 designates a guide pipe provided along a paper feed path for the web 2K at the driving side and extending from the area near the slitter 1 at its downstream side to the entrance to a folding unit F.

The guide pipe 19 has the same construction as the guide pipe 9. A paper feed rope 20 extends therethrough and is normally in a stand-by state. It has its portion at the upstream side connected to a leader 23 (formed with a cutout 22) through an arm 21 as with the paper feed rope 8. Numeral 24 designates a sensor for detecting whether or not the leader 23 is at a predetermined position.

Numeral 25 indicates a tape applicator provided under the leader 23 to stick the leader 23 on the tip 2K' of the web 2K at the driving side being fed from upstream.

It includes a sensor 26 provided at a level higher than the leader 23 and upstream of the sensor 24 to detect the position of the tip 2K' of the web 2K at the driving side. Numeral 27 indicates a guide plate provided below the leader 23 and formed in substantially the center thereof with a cutout 28. Under the guide plate 27, there is provided a tape reel 30 upon which is mounted a roll of single-sided adhesive tape 29.

A tape application roller 31 (FIG. 6) is mounted on the top end of an actuator 32A of a cylinder 32 so as to be movable up and down through the cutout 28 in the guide plate 27. A press roller 33 is mounted on the bottom of an actuator 34A of a cylinder 34 so as to be located over the guide plate 27 opposite to the roller 31 and be movable up and down. Guide members 35 and 36 are provided to guide the tape 29 mounted on the tape reel 30 into between the tape application roller 31 and the press roller 33. A tape cutter 37 is mounted on the end of an actuator 38A of a cylinder 38 so as to be movable to and fro.

Figure 6:
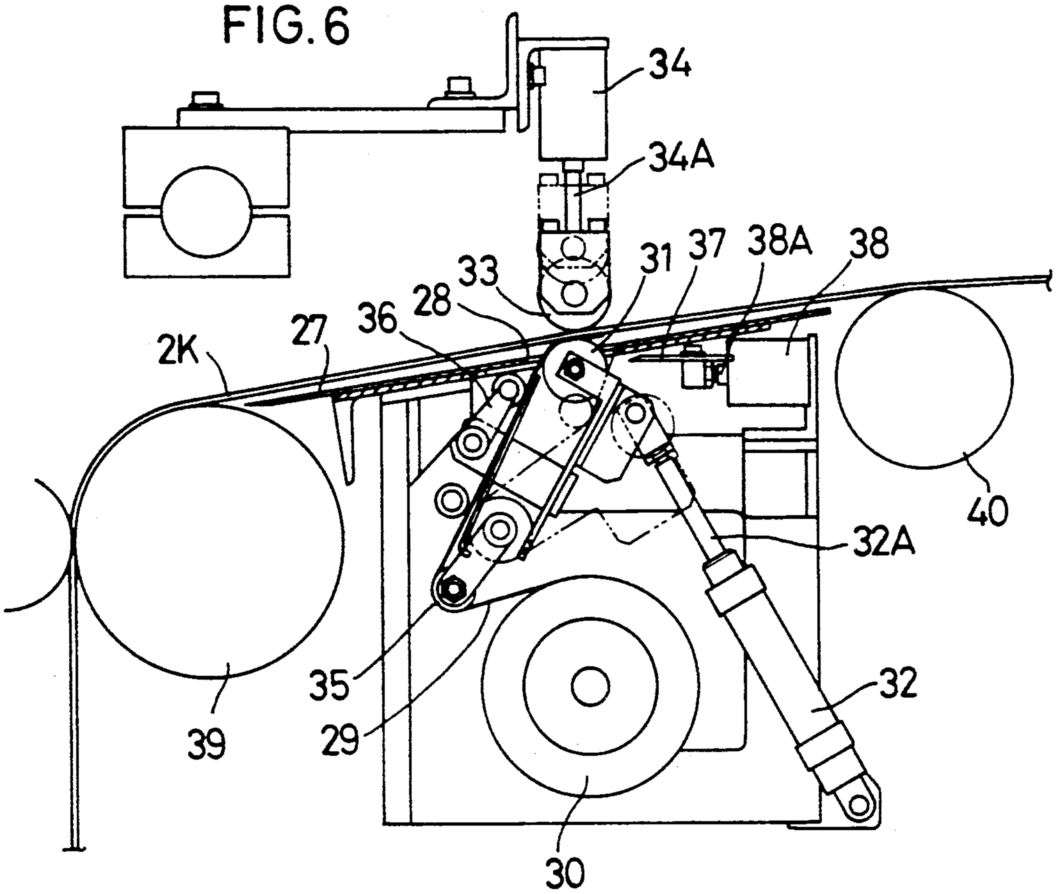
FIG. 6 is a side view of the same.

In FIGS. 5 and 6, rollers 39 and 40 serve to guide the web of paper 2K at the driving side.

The web of paper 2 is cut in half into the web 2S at the operating side and the web 2K at the driving side by the slitter 1. Since the web 2S at the operating side has its leading end secured to the leader 7 connected to the paper feed rope 8 through the arm 12, it is fed by the rope 8 toward the folding unit F through the paper feed path.

On the other hand, when the web 2K at the driving side is fed by a predetermined distance, the sensor 26 will detect the position of its end 2K' and activate the cylinder 32 to raise the tape application roller 31 with the end of the tape 29 stuck thereto. At the same time, the sensor 26 will activate the cylinder 34 to lower the press roller 33. Thus the leader 23 and the end 2K' of the web 2K will be pressed between the rollers 31 and 33 and joined together by the tape 29.

When the press roller 33 descends to its lowermost position, the paper feed rope 20 for the web K at the driving side, which have been kept at a stop, will begin to move downstream. This will cause the tape reel 30 to turn to unwind the tape 29, so that the tape 29 is put on the leader 23 over the entire length thereof and then on the web 2K at the driving side. After a predetermined period has passed, the cylinder 38 will be activated to cut the tape 29 with the tape cutter 37. Thus the web 2K at the driving side is connected to the paper feed rope 20 in the turnbar unit.

Then the web 2K at the driving side will pass the turnbars 17 and 18, where it is laid on the web 2S at the operating side, and proceed toward the folding unit F.

According to the present invention, there is no need of providing a plurality of slitter knives and controlling them one after another as in the prior art. Also, there is no need of providing a belt both at the operating side and the driving side throughout the machine from the paper feed unit to the folding unit as in the prior art. Thus, the construction is simpler and the production cost is lower. Also, the device according to the present invention is trouble-free and operates reliably because it includes a small number of parts.

What is claimed is:

1. An automatic paper feed device for a turnbar unit of a printing press having a slitter for slitting a web of paper being fed into two slitted webs, said device comprising: a linear paper feed means having a leader connected thereto; said linear paper feed means being adapted to start moving substantially in the same direction as the feed direction of said web of paper when the leading end of said web has passed said slitter, so that said leader will be moved in juxtaposition with the leading end of one of said two slitted webs; a sensor for detecting the position of said leading end of said one of the slitted webs and generating a signal; and laminating means adapted to be activated by the signal from said sensor to laminate said leader to said leading end of said one of the slitted webs; whereby said one of the slitted webs is guided through a predetermined paper feed path with said linear paper feed means.

* * * * *

UNITED STATES PATENT AND TRADEMARK OFFICE
CERTIFICATE OF CORRECTION

PATENT NO. : 5,078,825

DATED : January 7, 1992

INVENTOR(S) : Yoshiyuki HIRABAYASHI

It is certified that error appears in the above-identified patent and that said Letters Patent is hereby corrected as shown below:

Title page, insert the following:

--[73] Assignee: Hamada Printing Press Mfg. Co., Ltd., Osaka, Japan--.

Signed and Sealed this

First Day of June, 1993

*Attest:*

MICHAEL K. KIRK

*Attesting Officer*

*Acting Commissioner of Patents and Trademarks*